United States Patent
Wu

(10) Patent No.: US 6,443,480 B1
(45) Date of Patent: Sep. 3, 2002

(54) FOLDABLE STROLLER FORMED WITH PLASTIC-CLAD BAMBOO STRIPS

(76) Inventor: Jack Chieh-Yuan Wu, No. 69, Ta-Tung Road, Sec. 3, Hsi-Chih Chen, Taipei Hsien (TW)

( * ) Notice: Subject to any disclaimer, the term of this patent is extended or adjusted under 35 U.S.C. 154(b) by 0 days.

(21) Appl. No.: 09/843,043

(22) Filed: Apr. 24, 2001

(51) Int. Cl.[7] .................................................. B62B 1/00
(52) U.S. Cl. .................. 280/649; 280/644; 297/452.63
(58) Field of Search ................................ 280/642, 643, 280/644, 647, 648, 649, 650, 657, 658, 47.38, 47.4; 297/452.63, 452.64

(56) References Cited

U.S. PATENT DOCUMENTS

| 198,421 A | * | 12/1877 | Smith ..................... 297/452.63 |
| 235,437 A | * | 12/1880 | Hopkins ................. 297/452.63 |
| 4,111,454 A | * | 9/1978 | Kassai ........................ 280/649 |
| 4,137,685 A | * | 2/1979 | Fang et al. .................... 52/727 |
| 4,177,756 A | * | 12/1979 | Shigematsu ................. 118/404 |
| 4,367,897 A | * | 1/1983 | Cousins .................... 297/284.3 |
| 4,685,725 A | * | 8/1987 | Helfrich ....................... 297/45 |
| 4,730,872 A | * | 3/1988 | Golzer ................... 297/452.63 |
| 4,774,906 A | * | 10/1988 | Lu ............................. 118/404 |
| 5,197,753 A | * | 3/1993 | Liu ............................ 280/642 |
| 5,634,654 A | * | 6/1997 | Lin ............................ 280/649 |

* cited by examiner

Primary Examiner—Brian L. Johnson
Assistant Examiner—Bryan Fischmann

(57) ABSTRACT

A foldable stroller includes: a frame consisting of a pair of handle bars, a plurality of wheel bars pivotally secured to the handle bars having a plurality of wheels rotatably mounted on the wheel bars, a pair of seat bars pivotally connected with the wheel bars for supporting a seat, a pair of bottom struts diagonally pivotally secured on a bottom portion of the stroller and a pair of back struts diagonally pivotally secured to a back portion of the stroller for foldably linking the wheel bars and handle bars; with each bar or strut made of plastic-clad bamboo strip for preventing moisture corrosion, for comfortable seating and ergonomic handling.

1 Claim, 4 Drawing Sheets

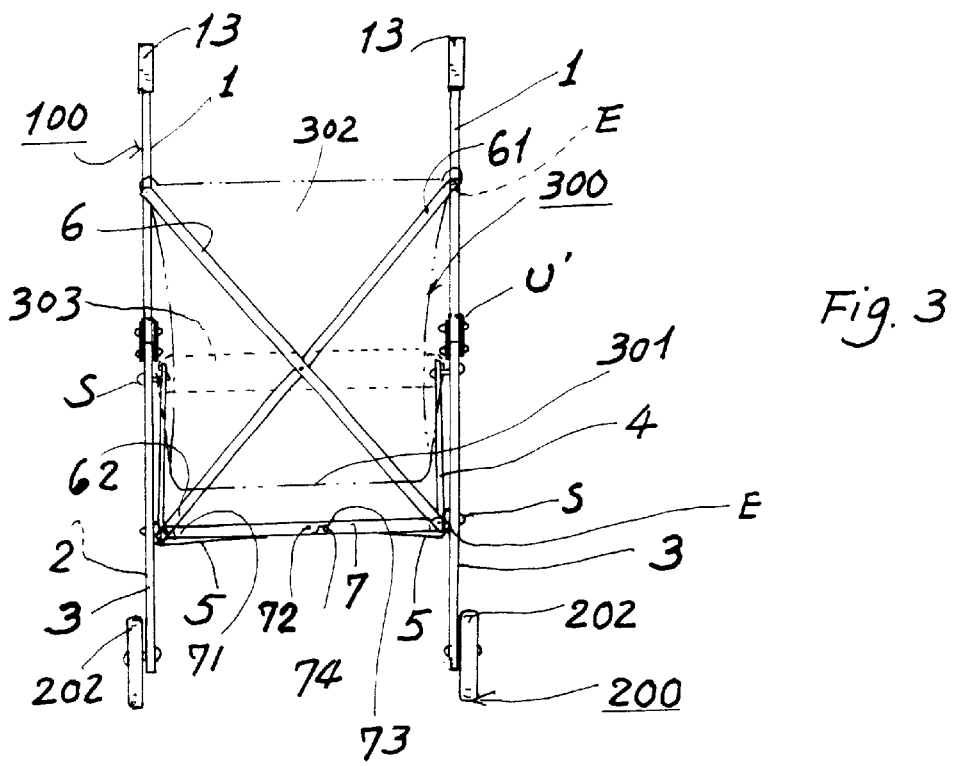
Fig. 3
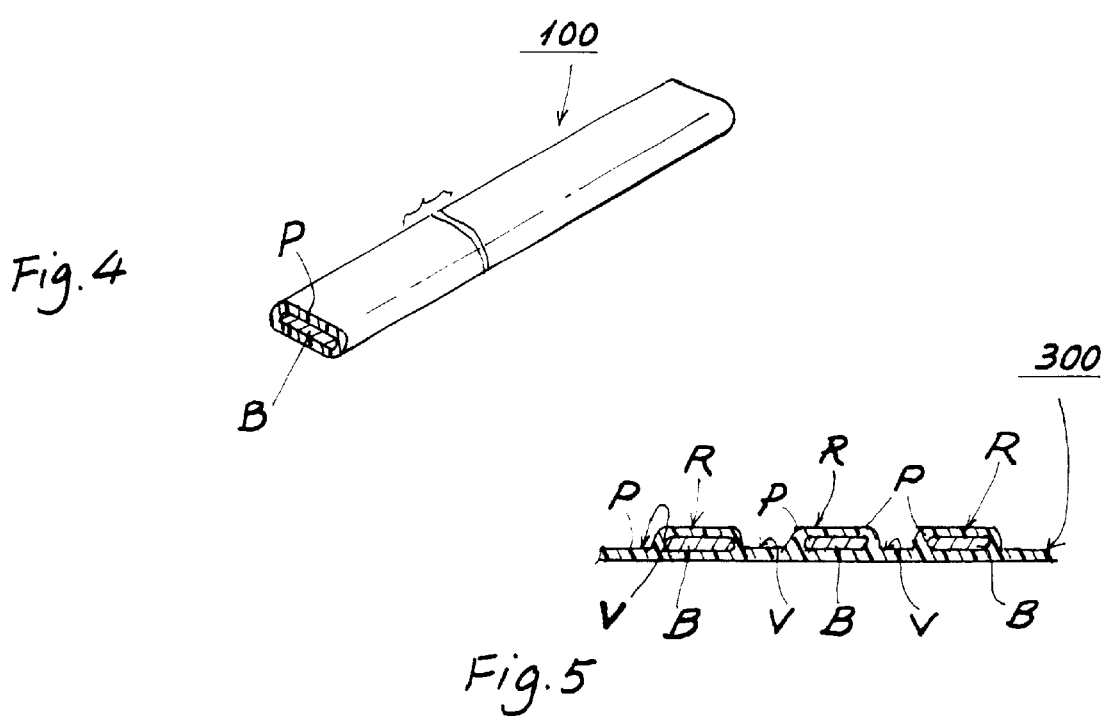
Fig. 4
Fig. 5

FOLDABLE STROLLER FORMED WITH PLASTIC-CLAD BAMBOO STRIPS

BACKGROUND OF THE INVENTION

A conventional baby stroller or push chair includes a frame made of steel or iron bars in order to support a seat and backrest for baby sitting. However, the steel or iron bars may become rusty by weather or moisture attack and easily damaged. The iron or steel-made frame of the baby stroller is heavy and inconvenient for carrying or pushing. Further treatment for finishing the steel frame for corrosion prevention may increase its production cost.

The present inventor has found the drawbacks of the conventional baby stroller and invented the present stroller made of plastic-clad bamboo strips.

SUMMARY OF THE INVENTION

The object of the present invention is to provide a foldable stroller including: a frame consisting of a pair of handle bars, a plurality of wheel bars pivotally secured to the handle bars having a plurality of wheels rotatably mounted on the wheel bars, a pair of seat bars pivotally connected with the wheel bars for supporting a seat, a pair of bottom struts diagonally pivotally secured on a bottom portion of the stroller and a pair of back struts diagonally pivotally secured on a back portion of the stroller for foldably linking the wheel bars and handle bars; with each bar or strut made of plastic-clad bamboo strips for preventing moisture corrosion, for comfortable seating and ergonomic handling.

BRIEF DESCRIPTION OF THE DRAWINGS

FIG. 3 is a rear view of the present invention.

FIG. 4 shows a cross section of a plastic-clad bamboo strip for making the present invention.

FIG. 5 is a cross sectional drawing of the chair member of the present invention.

DETAILED DESCRIPTION

Figure 1:
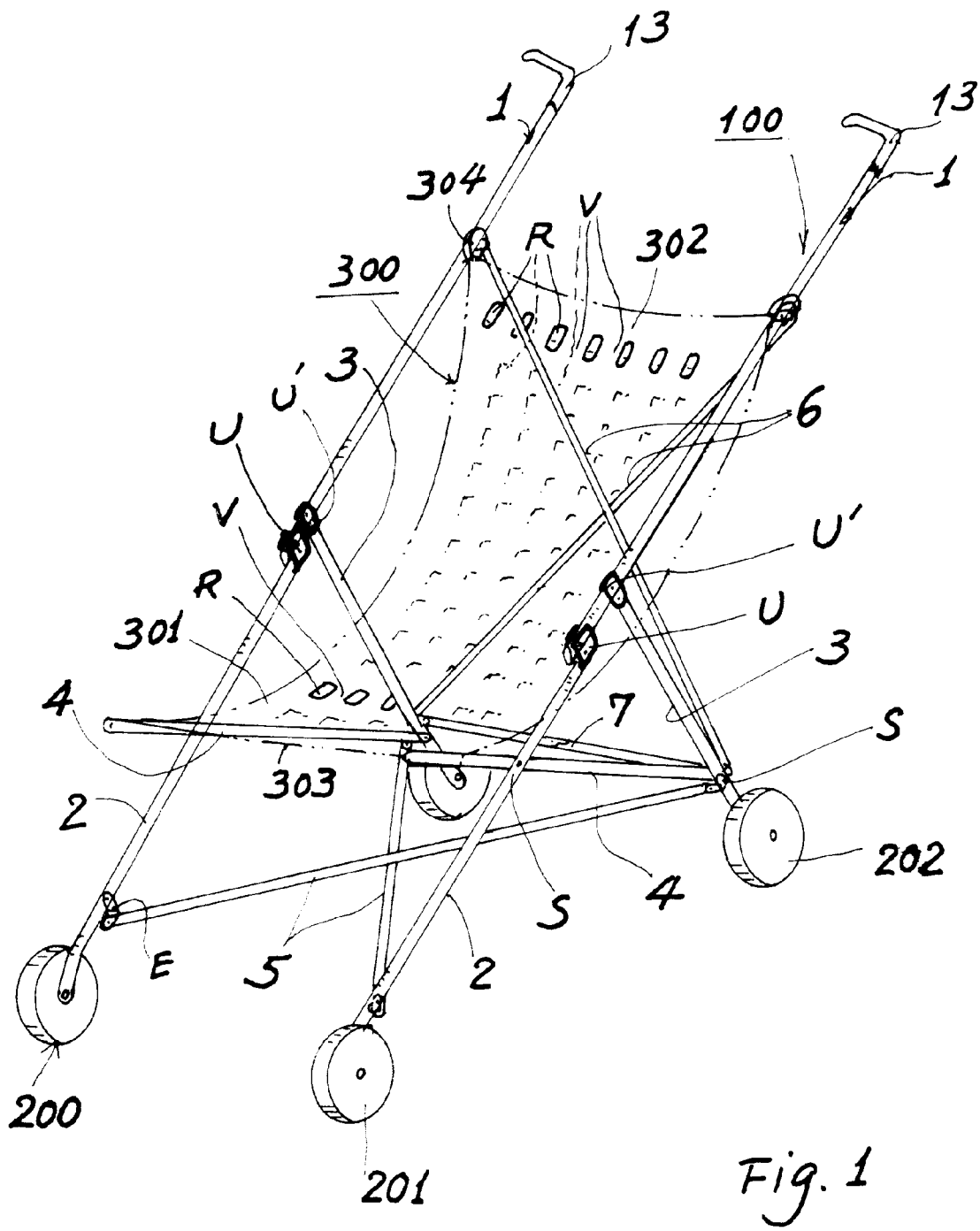
FIG. 1 is a perspective view of the present invention.
Figure 2:
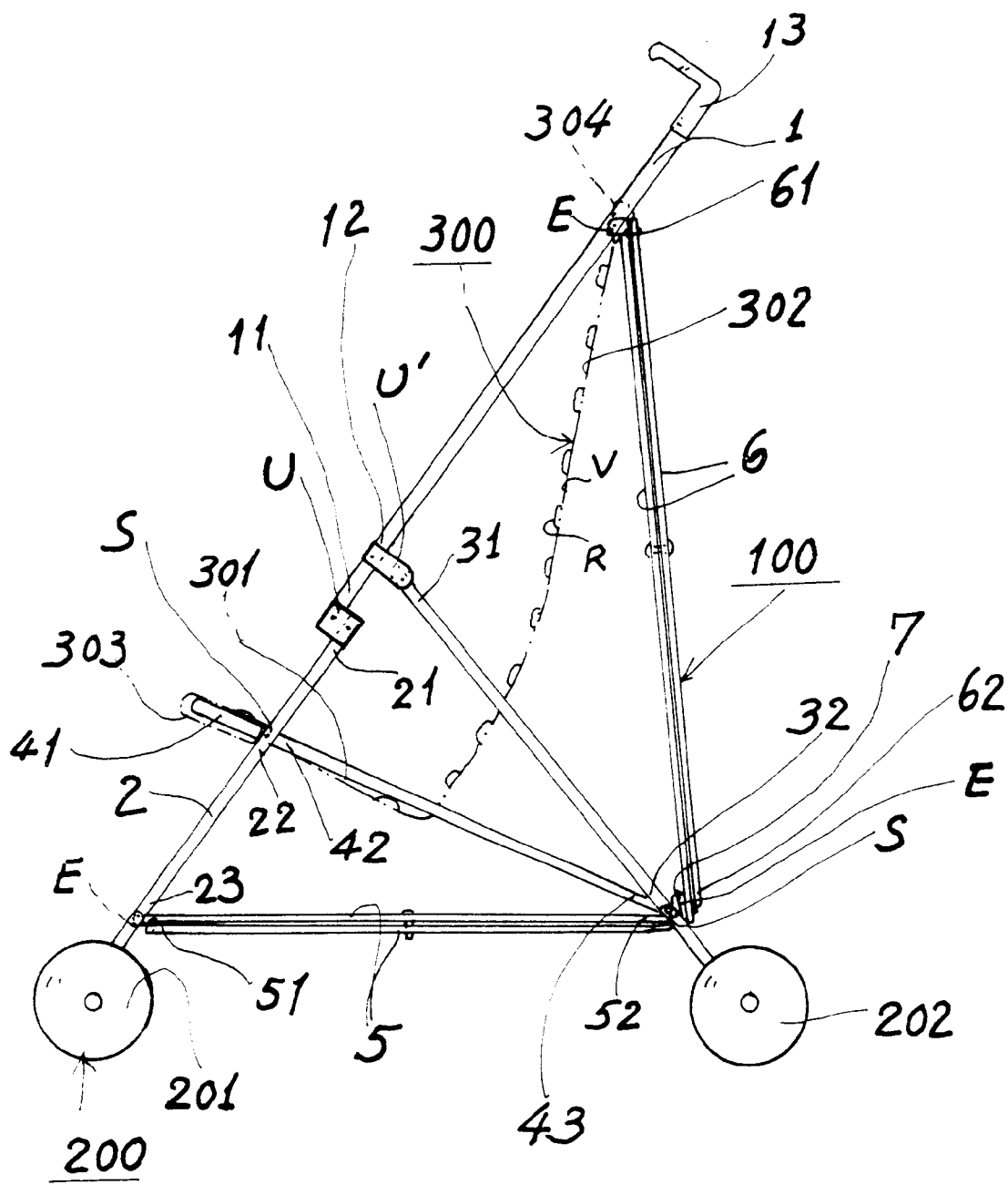
FIG. 2 is a side view of the present invention.

As shown in the drawing figures, the present invention comprises: a frame 100 including a pair of handle bars 1, a pair of front-wheel bars 2 each pivotally connected to each handle bar 1 by a U-shaped joint U, a pair of rear-wheel bars 3 each pivotally secured to each handle bar 1 by another U-shaped joint U', a pair of seat bars 4 each pivotally connected with each front-wheel bar 2 and each rear-wheel bar 3, a pair of bottom struts 5 diagonally pivotally secured to the lower portions of the front-wheel and rear-wheel bars 2, 3, a pair of back struts 6 diagonally pivotally secured to the handle bars 1 and the rear-wheel bars 3, and a pair of transverse links 7 foldably pivotally secured between the two back struts 6; a plurality of wheels 200 rotatably mounted on the front-wheel bars 2 and rear-wheel bars 3; and a chair member 300 having a seat portion 301 foldably secured to the pair of seat bars 4 and a backrest portion 302 foldably secured to the spair of handle bars 1 for a baby sitting.

As shown in FIG. 4, each bar 1, 2, 3 and 4, each strut 5, 6 and each link 7 is made of plastic-clad bamboo strip having each bamboo strip B clad with plastic material P having a suitable thickness and color. The plastic P clad on the bamboo strip B may be molded or formed with any decorative features (not shown) thereon. Suitable plastic materials including PU (polyurethane), PVC (polyvinyl chloride), PP (poly propylene), PE (polyethylene), etc., may be selected, but are not limited to these materials, in the present invention.

The chair member 300, either the seat portion 301 or the backrest portion 302, as shown in FIG. 5 includes a plurality of bamboo strips or pieces B clad in plastic films P to form a plurality of "ridge" portions R and a plurality of "valley" portions V to form an air-circulative or air flow passages among the ridge portions R and the valley portions V for a comfortable and ventilating seating on the chair member 300 since bamboo material has a cooling effect for radiating body heat of a baby when sitting on the chair member 300. Since bamboo has bamboo fibers which when branched to become a "stick" may injure the baby skin, the present invention use the plastic P to coat, cover, or clothe the bamboo strip or piece B to protect the bamboo from sticking the user.

If the bamboo strips of the chair member 300 are modified to be balls or polygonal pieces, ropes, wires or strings may be provided to connect the balls or pieces to be a seat or backrest portion (not shown).

Figure 6:
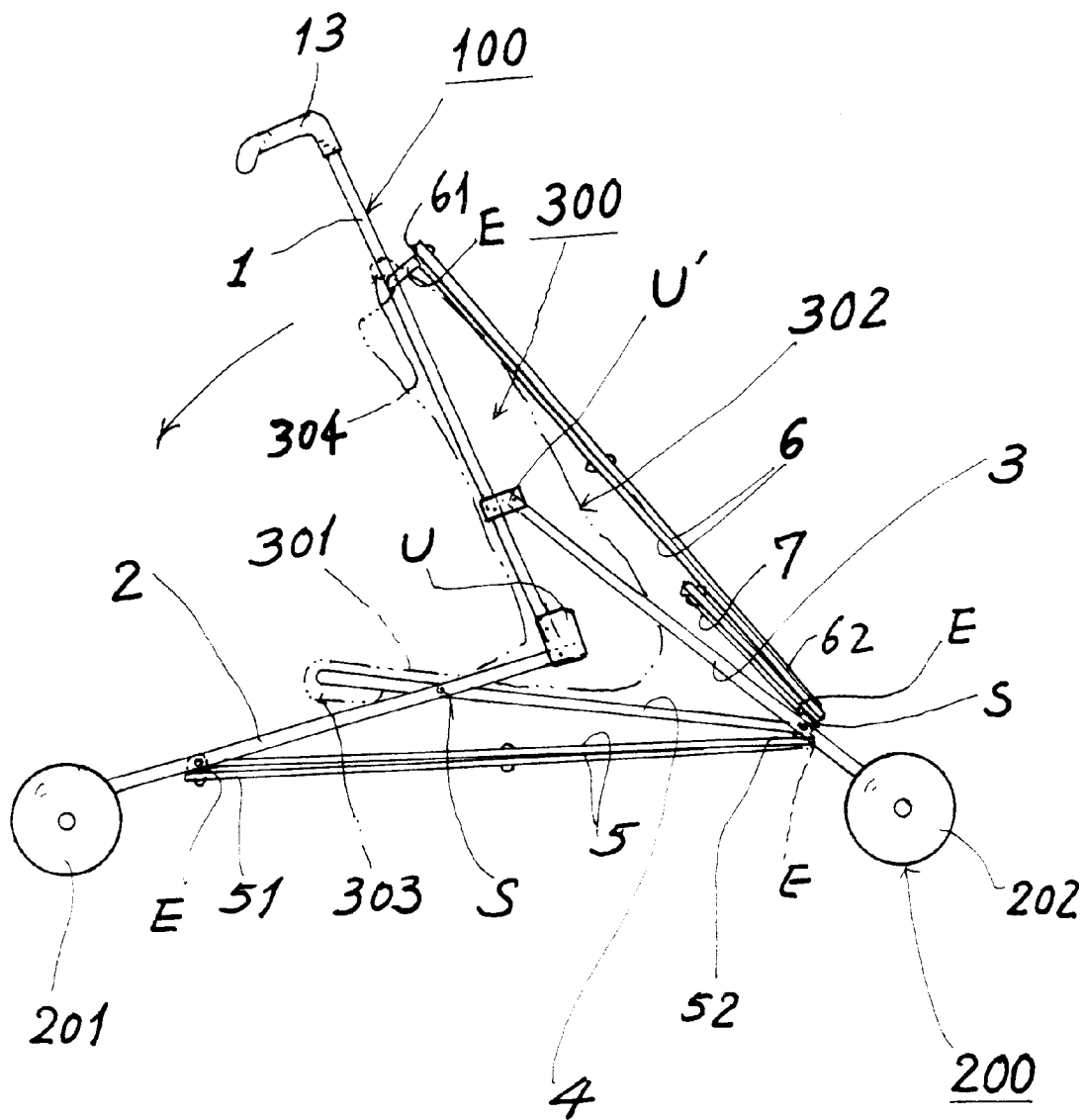
FIG. 6 shows a folding stroller in accordance with the present invention.

The valley portions V of the chair member 300 especially as shown in FIG. 5, like a hinge, provides a foldable "mechanism" when folding the stroller as shown on FIG. 6.

Each bar, strut or link of the frame 100 of the present invention as formed with plastic-clad bamboo strip, plate, or piece has the following advantages:

1. Bamboo material provides a cooling effect for the user;
2. Bamboo clad with plastic coating is lighter than steel bar for convenient handling and use;
3. Plastic as clad and disposed around the bamboo may be made by molding process to involve three-dimensional decorative features on the plastic layer (P) on the bamboo "core" (B);
4. Bamboo cost is cheaper than steel or iron bar, thereby decreasing the production cost of the stroller made of plastic-clad bamboo "core" material.

Each handle bar 1 has its lowermost portion 11 pivotally connected with an uppermost portion 21 of the front-wheel bar 2 by a U-shaped joint (U), having a lower portion 12 of the handle bar 1 pivotally connected with an upper portion 31 of the rear-wheel bar 3 by another U-shaped joint (U'), and a grip 13 formed on a top end of the handle bar 1. The grip 13, the joints U, U'and the wheels 200 may be made of plastic or other materials.

The front-wheel bar 2 has an upper portion 22 pivotally connected with an upper portion 42 of the seat bar 4 by a pivot S, having an upper section 41 of the seat bar 4 engageable with a jacket 303 of the seat portion 301 of the chair member 300 for supporting the seat portion 301 of the chair member 300, and a lower portion 23 of the front-wheel bar 2 secured with a front portion 51 of each bottom strut 5 by an elbow joint E.

The rear-wheel bar 3 has its lower portion 32 pivotally connected with a lower portion 43 of the seat bar 4 by a pivot S.

Each bottom strut 5 has its rear portion 52 pivotally secured to the lower portion 32 of the rear-wheel bar 3 by an elbow joint E.

The two bottom struts 5 are diagonally foldably pivotally secured to the lower portion of the front-wheel and rear-wheel bars 2, 3 by elbow joints E.

Each front wheel 201 or rear wheel 202 is rotatably mounted on each bottom of the wheel bar 2 or 3.

Each back strut 6 has its upper portion 61 pivotally secured to each handle bar 1 by an elbow joint E; and having a lower portion 62 of the strut 6 pivotally secured to the lower portion 32 of each rear-wheel bar 3 by another elbow joint E.

Both bottom struts 5 and back struts 6 provide a folding mechanism for folding and unfolding of the frame 100 of the present invention in commensuration with other pivotal connections such as the U-shaped joints U, U'or pivots S.

The pair of transverse links 7 are foldably pivotally connected between the two rear-wheel bars 3 and also pivotally connected between the two backs struts 6. Each transverse link 7 has its coupling end 73 pivotally connected with another coupling end of the corresponding transverse link 7 by a pin 72 and lockable on a protrusion 74 formed on another coupling end of another link 7 when extending (unfolding) the frame of the stroller especially as shown in FIG. 3.

The chair member 300 may be modified or simplied to be a cloth member or mesh (not) member for cost or other reasons, not limit in this invention. The upper portion 304 of the chair member 300 may be fastened to the upper portion of the two handle bars 1.

The U-shape joints U, U'or elbow joints E of the present invention may also be modified to other shapes or structures, not limited in the present invention.

The bamboo B as clad within the plastic layer P may also be substituted with wooden strip or other metallic strips for further choices.

The present invention may be modified without departing from the spirit and scope of the present invention.

I claim:

1. A foldable stroller comprising:

a frame consisting of a pair of handle bars, a pair of front-wheel bars each pivotally connected to each said handle bar, a pair of rear-wheel bars each pivotally connected to each said handle bar, a pair of seat bars each pivotally connected with each said front-wheel bar and each said rear-wheel bar, a pair of bottom struts foldably diagonally pivotally secured to a lower portion of each of said front-wheel and rear-wheel bars, a pair of back struts foldably diagonally pivotally secured between two said handle bars and two said rear-wheel bars, and a pair of transverse links foldably pivotally secured between two said rear-wheel bars;

a pair of front wheels respectively rotatably mounted on said pair of front-wheel bars and a pair of rear wheels respectively rotatably mounted on said pair of rear-wheel bars; and a chair member fastened to said pair of seat bars and said handle bars to be seated by a baby or user;

the improvement which comprises:

each said bar, each said strut and each said link formed with a plastic-clad bamboo strip having a bamboo strip core clad in a plastic layer; and said chair member including a seat portion and a backrest portion formed with a plurality of bamboo strips and pieces clad in a plastic coating disposed around the bamboo strips and pieces to form a plurality of ridge portions each having the bamboo clad in the plastic coating and a plurality of valley portions having no bamboo clad in plastic layer for forming air flow passages among the ridge portions and the valley portions for ventilation; said valley portions forming a hinge portion for folding or unfolding of the chair member upon folding or unfolding of the stroller.

\* \* \* \* \*